(12) United States Patent
Chen et al.

(10) Patent No.: US 9,143,666 B2
(45) Date of Patent: Sep. 22, 2015

(54) SURVEILLANCE DEVICE CAPABLE OF FOCUSING

(71) Applicant: ShenZhen Treasure City Technology Co., LTD., ShenZhen (CN)

(72) Inventors: Shu-Ying Chen, New Taipei (TW); Der-Cheng Weng, New Taipei (TW)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 308 days.

(21) Appl. No.: 13/873,186

(22) Filed: Apr. 29, 2013

(65) Prior Publication Data
US 2014/0009607 A1     Jan. 9, 2014

(30) Foreign Application Priority Data

Jul. 5, 2012   (TW) .................................. 101124155

(51) Int. Cl.
    *H04N 5/225*   (2006.01)
(52) U.S. Cl.
    CPC .................................. *H04N 5/2253* (2013.01)
(58) Field of Classification Search
    CPC .................................................... H04N 5/2253
    See application file for complete search history.

(56) References Cited

U.S. PATENT DOCUMENTS

| | | | |
|---|---|---|---|
| 2009/0322931 A1* | 12/2009 | Cheng ........................... | 348/345 |
| 2012/0092550 A1* | 4/2012 | Urashima et al. ............. | 348/374 |
| 2012/0133825 A1* | 5/2012 | Nakajima et al. ............. | 348/374 |
| 2013/0162894 A1* | 6/2013 | Lee ................................ | 348/373 |
| 2013/0215311 A1* | 8/2013 | Uemura ........................ | 348/308 |
| 2014/0009607 A1* | 1/2014 | Chen et al. .................... | 348/143 |

* cited by examiner

*Primary Examiner* — W B Perkey
(74) *Attorney, Agent, or Firm* — Novak Druce Connolly Bove + Quigg LLP

(57) ABSTRACT

A surveillance device includes a front cover, at least two guide rods, a lens module, a mounting plate, a first balance spring, a circuit board, and a number of second balance springs. The guide rods are mounted in the front cover. The lens module is received the first through hole. The mounting plate is slidably mounted to the guide rods. The mounting plate defines a through hole. The first balance spring is positioned between the front cover and the mounting plate. The circuit board is mounted to the mounting plate and opposite to the first balance spring. The image sensor is mounted on the circuit board and faces the through and the lens module. The second balance springs are positioned between the mounting plate and the circuit board. The first balance spring and the second balance springs keep the image sensor being aligned with the lens module.

9 Claims, 5 Drawing Sheets

SURVEILLANCE DEVICE CAPABLE OF FOCUSING

BACKGROUND

1. Technical Field

The present disclosure relates to surveillance devices, and particularly to a surveillance device capable of focusing.

2. Description of Related Art

A typical surveillance device includes a lens module, an image sensor, and a focusing assembly. The focusing assembly usually includes a mounting plate, a spring, and a driving device. The image sensor is mounted on the mounting plate and aligned with the lens module. The spring is connected between the mounting plate and the driving device and opposite to the lens module. When focusing, the driving device pulls or pushes the mounting plate such the image sensor move away from or toward the lens module to achieve focus. However, the mounting plate sometimes tilts relative to the lens module, resulting in the image sensor tilting relative to the lens module and influencing image quality.

Therefore, it is desirable to provide a surveillance device, which can overcome the limitations described.

DETAILED DESCRIPTION

Embodiments of the disclosure will be described with reference to the drawings.

Figure 1:
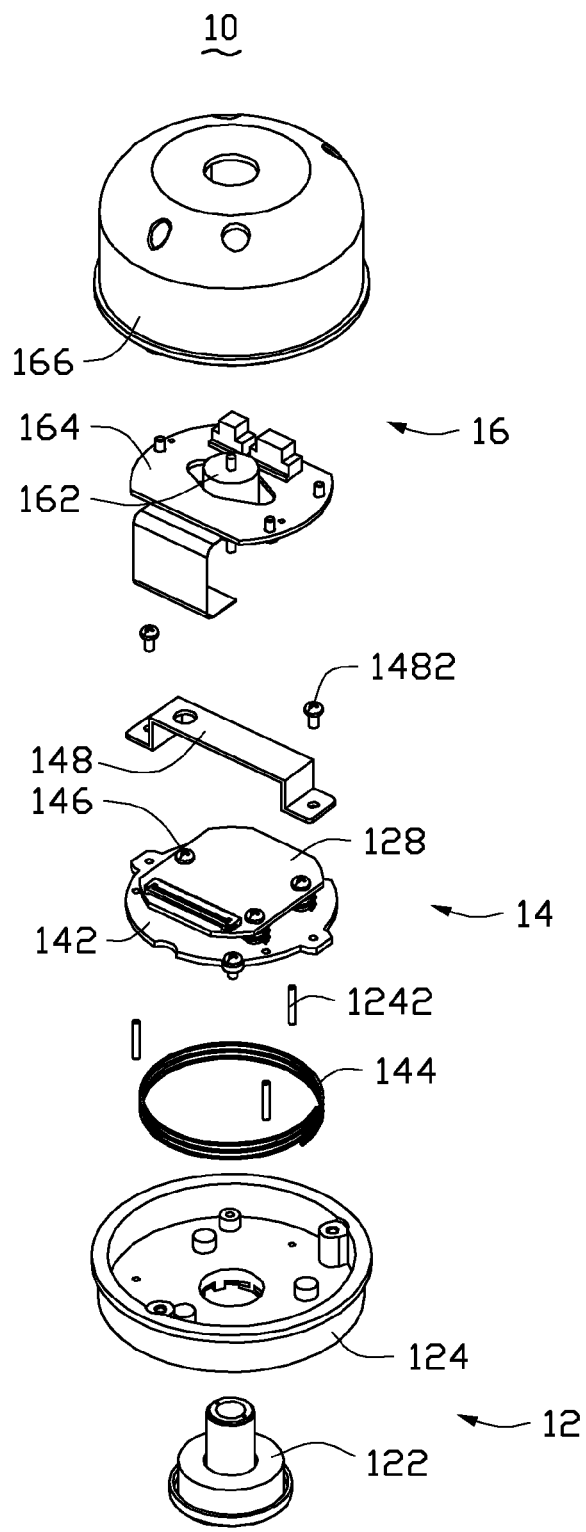
FIG. 1 is an exploded, isometric view of a surveillance device capable of focusing, in accordance with an exemplary embodiment.
Figure 2:
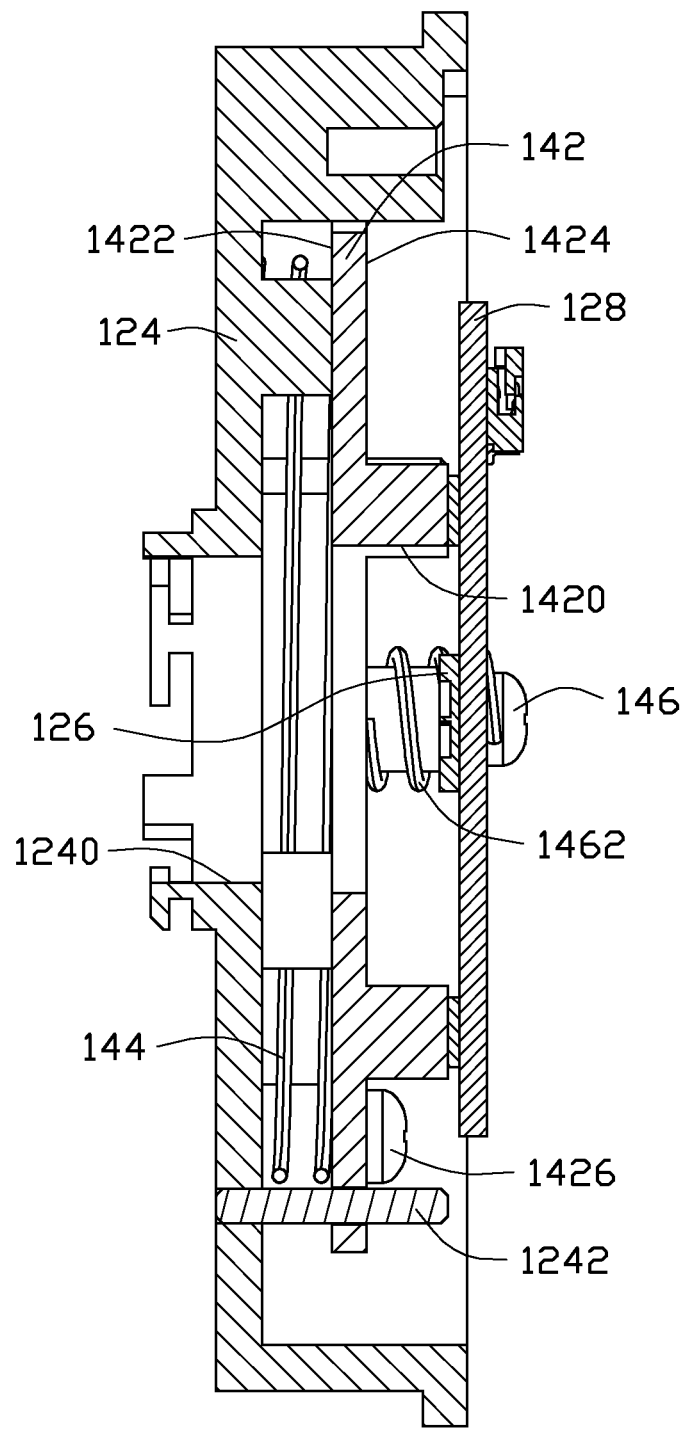
FIG. 2 is a cross-sectional view of a front cover and a mounting plate of the surveillance device.

FIGS. 1 and 2 show a surveillance device 10, in accordance with an exemplary embodiment. The surveillance device 10 includes a camera module 12, an adjustment assembly 14, and a driving device 16.

Figure 3:
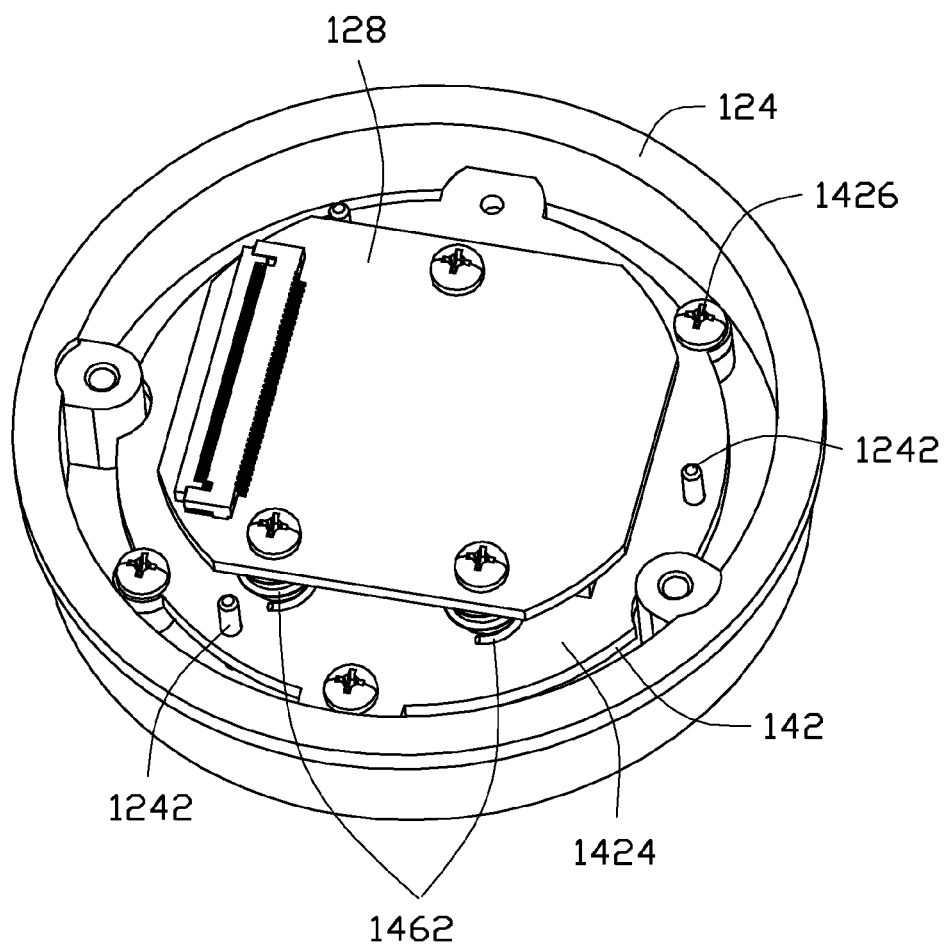
FIG. 3 is an assembled, isometric view of the front cover and the mounting plate.
Figure 4:
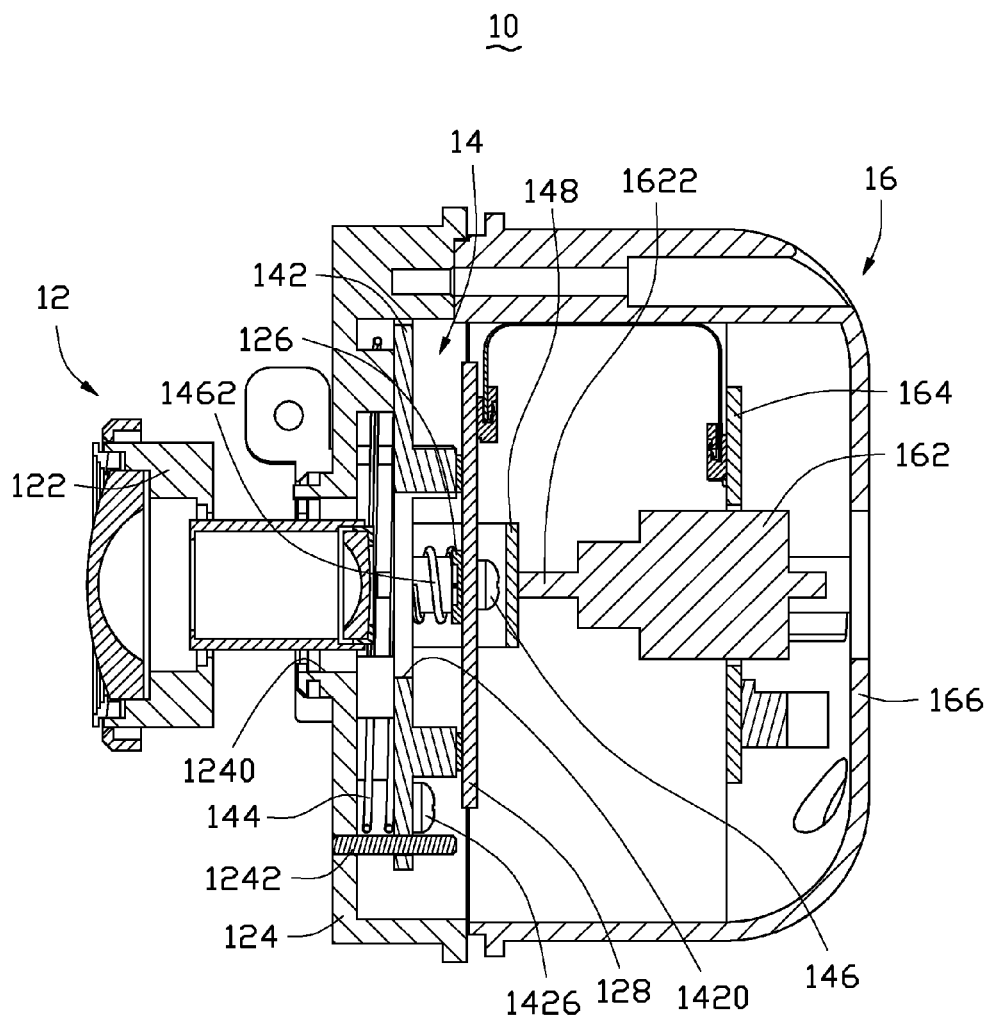
FIG. 4 is a cross-sectional view of the surveillance device.
Figure 5:
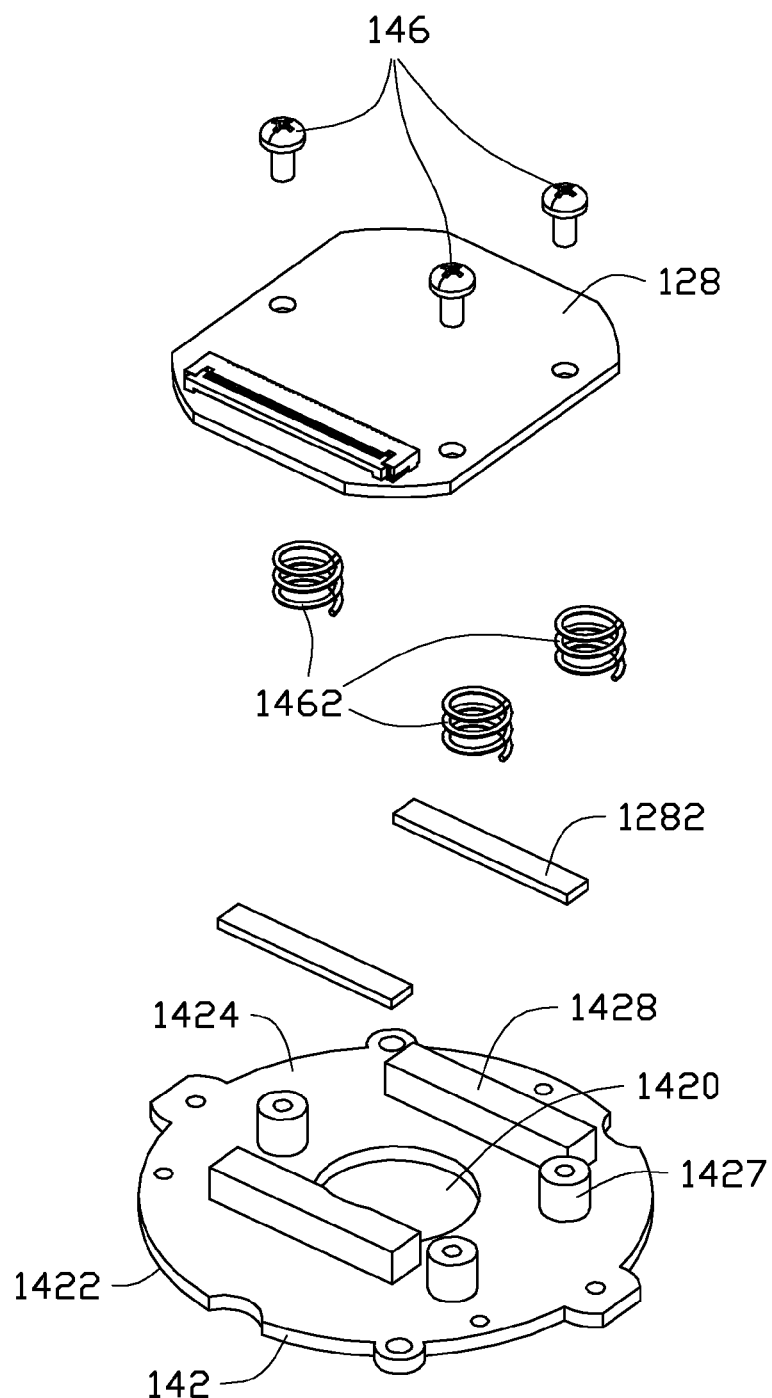
FIG. 5 an exploded, isometric view of the mounting plate and a circuit board of the surveillance device.

As shown in FIGS. 3 to 5, the camera module 12 includes a lens module 122, a front cover 124, an image sensor 126, and a circuit board 128. The front cover 124 defines a first through hole 1240 passing through the center thereof. The lens module 12 is fixed on the front cover 124 and partially received in the first through hole 1240. At least two guide rods 1242 are fixed in the front cover 124. In the embodiment, the number of the guide rods 1242 is three. The three guide rods 1242 are uniformly distributed around the first through hole 1240 and parallel to an optical axis of the lens module 122.

The adjustment assembly 14 includes a mounting plate 142, a number of auxiliary screws 1426, a first balance spring 144, a number of adjustment screws 146, a number of second balance springs 1462 corresponding to the adjustment screws 146, and a connection plate 148.

The mounting plate 142 is substantially circular and includes a front surface 1422 and a rear surface 1424 opposite to the front surface 1422. The mounting plate 142 defines a second through hole 1420 in the center and a number of guide holes (not labeled) around the second through hole 1420. The second through hole 1420 corresponds to the first through hole 1240. One end of the first balance spring 144 is attached to an inner surface of the front cover 124. Each guide rod 1242 passes through a respective guide hole. The three guide rods 1242 are perpendicular to the front surface 1422 and uniformly distributed around the second through hole 1420. The mounting plate 142 is slidable along the guide rods 1242. The second through hole 1420 is aligned with the first through hole 1240.

The auxiliary screws 1426 pre-fixs the mounting plate 142 to the inner surface of the front cover 124 with the front surface 1422 facing the front cover 124. The other end of the first balance spring 1462 is attached on the front surface 1422. The first balance spring 1462 is around and coaxial with the first through hole 1240 and the second through hole 1420. The mounting plate 142 also includes a number of assembling portions 1247 extending from the rear surface 1424. In the embodiment, the number of the assembling portions 1247 is three. Each assembling portion 1247 is hollow cylindrical and defines inner threads for engaging with a corresponding adjustment screw 146. Two first heat dissipation element 1428 are positioned on the rear surface 1424 adjacent to the second through hole 1420. Each first heat dissipation element 1428 is made of metal and substantially rectangular.

The image sensor 126 is mounted on one surface of the circuit board 128. Two second heat dissipation elements 1282 are positioned on the circuit board 126 and at two sides of the image sensor 126. Each second balance spring 1462 sleeves on a respective assembling portion 1427. The circuit board 128 is fixed to the mounting plate 142 with each adjustment screw 146 passing the circuit board 128 and engaging with a respective assembling portion 1427. Each second heat dissipation element 1282 contacts with a first heat dissipation element 1428. The image sensor 126 faces the second through hole 1420 and the lens module 122 and a center axis of the image sensor 126 substantially coincides with the optical axis of the lens module 122. Each second balance spring 1462 is pressed between the rear surface 1424 and the circuit board 128.

The connection plate 148 is in a bridge-shape and includes two bending ends. The two bending ends of connection plate 148 are fixed to the rear surface 1424 of the mounting plate 142 by two fasteners 1482. The connection plate 148 faces away the lens module 122. The connection plate 148 is symmetrical about a diameter of the second through hole 1420.

The driving device 16 includes a motor 162, a supporting base 164, and a rear cover 166. The motor 162 is a stepper motor and is mounted on the supporting base 164. The motor 162 includes a driving shaft 1622. The supporting base 164 is fixed to an inner surface of the rear cover 166. The front cover 124 and the rear cover 166 are assembled to each other and cooperatively receive the lens module 122 the mounting plate 142, and the supporting base 164. The driving shaft 1622 is attached on the connection plate 148 and coincides with the optical axis of the lens module 122.

In use, the auxiliary screws 1426 is removed from front cover 124 and the mounting plate 142, the first balance spring 144 presses on the front cover 124 and the mounting plate 142. One or more than one of the adjustment screws 146 can be rotated to adjust the center axis of the image sensor 126 to rightly coincides with the optical axis of the lens module 122. The motor 162 drives the mounting plate 142 and the circuit board 128 to move away from or towards the lens module 122. Accordingly, the image sensor 126 moves away from or towards the lens module 122 to achieve focusing. The first balance spring 144 and the second balance springs 1462 keep the mounting plate 142 the circuit board 128 being always perpendicular to the center axis of the lens module 122 as such the center axis of the image sensor 126 always coinciding with the optical axis of the lens module 122. However, it is unnecessary to rotate one or more than one adjustment screws 146 if the center axis of the image sensor 126 already coincides with the optical axis of when the lens module circuit board 128 is fixed to the mounting plate 142.

Heat generated by the circuit board 128 can be dissipated through the second heat dissipation element 1282 and the first heat dissipation element 1428. In alternative embodiments, the second heat dissipation element 1282 and the first heat dissipation element 1428 can be omitted.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A surveillance device, comprising:
a front cover defining a first through hole;
at least two guide rods mounting in the front cover;
a lens module mounted on the front cover and received in the first through hole;
a mounting plate mounted to the guide rods and being slidable along the guide rods, the mounting plate defining a second through hole corresponding to the first through hole;
a first balance spring positioned between the front cover and the mounting plate;
a circuit board mounted to the mounting plate and opposite to the first balance spring;
an image sensor mounted on the circuit board facing the second through and the lens module; and
a number of second balance springs positioned between the mounting plate and the circuit board;
wherein the first balance spring presses on the front cover and the mounting plate and the first balance spring press on the front cover and the mounting plate to keep the image sensor being aligned with the lens module.

2. The surveillance device of claim 1, wherein the number of the guide rods is three, the mounting plate comprises a front surface and a rear surface opposite to the front surface, the second through hole passing through the front surface and the second surface, and the three guide rods pass through the mounting plate and are uniformly distributed around the second through hole.

3. The surveillance device of claim 2, wherein the guide rods are perpendicular to the front surface.

4. The surveillance device of claim 2, wherein the first balance spring is around and coaxial with the first through hole and the second through hole.

5. The surveillance device of claim 2, wherein a number of assembling portions extend from the rear surface, each second balance spring sleeves on a respective assembling portion.

6. The surveillance device of claim 5, wherein the surveillance device comprises a number of adjustment screws, each assembling portion is hollow cylindrical and defines inner threads, and each adjustment screw passes through the circuit board and engages with an assembling portion.

7. The surveillance device of claim 6, wherein the number of the assembling portion is three.

8. The surveillance device of claim 6, wherein the surveillance device comprises a connection plate and a motor, the connection plate is mounted to the mounting plate and facing away the lens module, the motor is a stepper motor and comprises a driving shaft pressing on the connection plate, the motor is configured to drive the mounting plate and the circuit board to move away from or towards the lens module.

9. The surveillance device of claim 6, wherein the surveillance device comprises two first heat dissipation elements positioned on the rear surface and two second heat dissipation elements positioned on the circuit board at two sides of the image sensor, each first dissipation element contacts with a respective second dissipation element.

* * * * *